United States Patent Office 3,578,499

Patented May 11, 1971

3,578,499

GELLING COMPOSITION FOR GENERAL PURPOSE CLEANING AND SANITIZING

Homer E. Crotty and Charles R. Coffey, Cincinnati, and Thomas C. Tesdahl, Forest Park, Ohio, assignors to W. R. Grace & Co., New York, N.Y.

No Drawing. Filed Aug. 2, 1968, Ser. No. 749,585
Int. Cl. B08b *7/00*; C11d *3/48*
U.S. Cl. 134—4 6 Claims

ABSTRACT OF THE DISCLOSURE

The disclosed invention includes a powder gelling composition containing a gelling agent, a neutral diluent, a wetting agent, and desirably a dye or coloring additive. The powder gelling composition when added to water forms a gel. To this gel may be added acid or alkaline materials for cleaning, biocidal agents for sanitizing, or other materials to produce a desired effect. The significant advantage of this method is the increased residence time and hence contact time between agents in the gel and the surface to be acted on.

This invention relates to a powder composition, to gels prepared therewith, and to methods of using such gels with appropriate additives for cleaning and sanitizing a variety of irregularly shaped surfaces by applying a tion provides a powder, gels prepared therewith, and a method for cleaning, sanitizing or other effects on a variety of irregularity shaped surfaces by applying a surface adhering layer of gel, with appropriate additives, which is permitted to remain in place for a period of time for cleaning and sanitizing, after which the gel is removed by rinsing. After removal of the surface adhering film, a cleaned or sanitized surface remains.

In an embodiment of the present invention there is provided a method for gelling wherein the primary component of the gelling agent is a polysaccharide of the type produced from carbohydrates by the action of bacteria of the genus Xanthomonas.

Numerous detergents are available to the art for cleaning purposes. Typically, these detergents appear in concentrated form for addition to a solvent such as water which may be then applied to a surface to be cleaned. Incidental to cleaning, these materials may include germicidal agents or related materials for sanitizing a surface to be cleaned. Alternatively, germicidal agents may be separately applied subsequent to a cleaning operation. A defect in conventional materials used heretofore has been the high fluidity characteristic which upon application to, for example, vertical surfaces, results in the applied materials having a tendency to run and ineffectively clean the surface. Resultingly, in most instances, insubstantial contact time is permitted for adequate cleaning and sanitizing of surfaces to be cleaned.

Considerable interest in polysaccharides produced by the bacterial fermentation of carbohydrates has been exhibited in recent years. These polysaccharides have properties which permit their use as thickening agents for water. These polysaccharides have been used as foam enhancers for beer, as emulsion stabilizers for mayonnaise and the like, and at water thickening agents for use in secondary recovery operations carried out in the petroleum industry.

It has been known heretofore as described in U.S. Pat. No. 3,383,307 that it is possible to make gels by adding a polysaccharide produced from carbohydrates by the action of bacteria of the genus Xanthomonas, to water at rather low levels such as from 0.05 to 5 weight percent or more and usually from 0.1 to 1 weight percent with a preference of from about 0.2 to 0.75 weight percent based on the weight of water. Into this thickened water is added a salt of a trivalent metal such as aluminum sulfate and, if desired, a metallic promoter such as powdered zinc metal. The addition of a trivalent metal salt such as aluminum sulfate and a metallic promoter such as powdered zinc, to the polysaccharide-thickened water, results in gel formation.

It has now been found that by the practice of the present invention a powder gelling composition is provided which when combined with water and appropriate additives for cleaning and sanitizing may be applied as an adhering gel film to a surface to be cleaned and sanitized for a period of time affording adequate cleaning and sanitizing of the surface. Thereafter, the applied gel may be readily removed by rinsing with water.

Generally stated, the present invention provides a powder gelling composition including a gelling agent, a neutral diluent, a wetting agent, a dispersing agent, and if desired a dye or coloring additive. The powder gelling composition may be characterized as a flowable powder which upon addition in prescribed amounts to a suitable solvent such as water forms a thixotropic or gelled mass which when appropriate additives are introduced for cleaning or sanitizing may be readily applied as an adhering film to a surface for cleaning and sanitizing thereof. The thin film is permitted to adhere to the surface for a period of time sufficient to provide adequate cleaning and sanitizing after which period the thin film is removed by rinsing with water.

The present invention also provides a method for cleaning and sanitizing surfaces and particularly irregularly positioned wall or equipment surfaces disposed either overhead or vertical without concern for spillage and running of the cleaning composition as is typically encountered when using conventional solutions or detergent compositions.

The various components of the powder gelling composition when formulated usefully provide a concentrated gelling agent which may be used for general cleaning and to which are added appropriate agents for cleaning and sanitizing although other less conventional solvents may be employed provided the necessary thixotropic or gel surface adhering characteristics are obtained in the composition applied to a surface to be sanitized or cleaned.

The gelling agent typically employed as a component of the present powder gelling composition is generally one characterized with heat stability, pH stability and high shear stability. A particular gelling agent found useful herein is polysaccharide type materials such as those produced by the action of bacteria of the genus Xanthomonas on carbohydrates. These biochemically synthesized polysaccharides are commonly referred to in the art as industrial gums. Various methods for the biochemical production of gums with Xanthomonas organisms are known, such as disclosed for example in U.S. Pats. Nos. 3,020,206 and 3,020,207. Broadly described, these known processes for preparing polysaccharides involve the preparation of a broth containing a carbohydrate nutrient such as a cereal grain flour, preferably in a finely ground form. The nutrient is heat sterilized to kill extraneous bacteria which produce unwanted products. The broth, ordinarily containing about 100 parts by weight of water, will usually contain from 1 to 5 parts by weight of a suitable carbohydrate nutrient, organic nitrogen sources, and appropriate trace elements. This broth is then inoculated with bacteria of the genus Xanthomonas (e.g. *Xanthomonas campestris*) and fermented under aerobic conditions. Generally, pH control (usually between about 5 and 8.5 and preferably from 6.5 to 7.2) is necessary to achieve optimum yields. Fermentation is allowed to proceed until the culture viscosity has reached a desired level, usually on the order of 3000 to 12,000 centipoises. At this point, the desired gum may be recovered by any suitable procedure. Spray drying is one effective recovery technique that has been used. After proper drying, the gum will usually be a slightly colored, light, fluffy powder.

An example of a useful Xanthan material is that sold under the trademark Kelzan M by the Kelco Co., of San Diego, Calif. Other related water soluble materials may be employed as the gelling agent such as polymers exemplified by water soluble polymers of the type ethylene-maleic anhydride copolymer, polymethylvinyl ether maleic anhydride copolymer, natural hydrophilic gum colloids, anionic heteropolysaccharide biopolymeric materials derived by microbial fermentation, and the like. Typically, these materials are water soluble while providing high heat, pH, and shear stability while retaining the ability to form a thixotropic or gelled mass when added to a suitable solvent such as water or the like.

A flexible method for forming gels under ambient conditions is provided by the present invention although other conditions may be used, if desired. For example, the powder gelling composition may be added to water and by proper selection of ingredients, a gel may be made to form almost immediately. These gels adhere to many surfaces and, thus, contained water will not run off.

Generally, wide ranges of gelling agent may be included in formulating the powdered gelled composition which appears as a concentrated formulation. Typically, however, the gelling agent is included in an amount from about 20 to about 60 parts by weight of powder gelling agent although amounts up to about 100 parts by weight may be included if desired.

A second component typically included in the powder gelling composition is a neutral diluent such as sodium sulfate, sodium chloride, or the like which may be added in any suitable amount up to 95 parts by weight and typically in an amount from about 40 to about 80 parts by weight of the powder gelling composition. Various additional materials may be added as neutral diluents providing the materials characterize the powder gelling composition with a substantially neutral pH in the range of about pH 6 to about pH 8 while retaining the other desired properties of the powder gelling composition while further retaining surface adhering properties of the thixotropic or gel cleaning solution.

A third component typically included in the present powder gelling composition is a wetting agent exemplified by a linear alkyl benzene sulfonate type material wherein the alkyl group may include from about 12 to about 14 carbon atoms. The wetting agent should be desirably characterized as an anionic agent although it is recognized that nonionic surfactants may also be employed. One wetting agent found useful herein is the commercially available sulfonate of dodecylbenzene. Wetting agents may be employed in an amount up to about 10 parts by weight and preferably in an amount from about 1 to 4 parts by weight to the powder gelling composition.

A fourth component which may be included in formulating the powder gelling composition is a liquid dispersing agent exemplified by propylene glycol or the like. The dispersing agent is found useful in formation of a powder gelling composition having components uniformly dispersed throughout. The dispersing agent is added in an amount up to about 10 parts by weight and desirably in an amount of about 1 to about 3 parts by weight to form the powder gelling composition.

Optionally, a dye or coloring agent is desirably added to the powder gelling composition to provide a suitable indicator for application and removal of a thin film of surface adhering gel. The amount of dye or coloring agent which is added in formation of the gelled powdered composition is that sufficient to form a suitable indicating means by color contrast to adequately indicate the presence of a thin film of cleaning gel applied to the surface to be cleaned. Typically, a suitable dye found useful herein is fluorescein which may be added in an amount up to about 1 part by weight and preferably in an amount of about 0.1 to about 0.3 part by weight to the powder gelling composition.

The various components used to formulate the powder gelling composition may be combined by uniformly mixing the various additions until a substantially uniform blend is obtained.

Although not necessarily required in the powder gelling composition of the present invention, it is recognized that additional components may be added such as filler materials, antiseptic materials, sanitizing materials, and the like provided these materials do not deleteriously affect formation of a thixotropic or gelled mass when the powder gelling composition is added to a suitable solvent such as water.

The concentrate of powder gelling composition may be added to a suitable solvent such as water or the like for formation of a thixotropic mass or gel. The concentrated powder gelling composition may be added in an amount up to about 10 percent by weight and desirably in an amount from about 0.1 percent up to about 5 percent by weight based on the total weight of water. Preferably, the powder gelling composition is added in an amount from about 0.5 percent up to about 3 percent by weight based on the total weight of water desirably at a temperature of about 180° F. to form a useful surface adhering film when applied as a thixotropic mass.

Various additional materials are added to the thixotropic mass such as for example, acidic or alkaline materials for cleaning and sanitizing purposes, as well as disinfectant materials all having water soluble properties. These materials are added in any effective amount as desired. Various other materials such as deodorizing agents and the like may be included in the thixotropic mass if desired. Examples of sanitizing agents customarily employed in such compositions and found useful herein include chlorinated phenyl derivatives and the like as well as related halogen substituted phenol derivatives and halogens either elemental or complexed.

After the thixotropic mass or gel has been prepared with agents for cleaning and sanitizing, the gel is available for application to a surface which is to be cleaned or sanitized. Application of the thixotropic mass may be by brushing or spraying although any suitable means such as roll application or the like may be employed. After application of a surface adhering gel to a surface to be cleaned and sanitized, the film of gel is permitted to adhere to the surface for a desired period of time sufficient to provide adequate and effective cleaning and sanitizing actions. It is typically found that a film of gel may be applied and retained in position for a period of time such as, for example, about 30 to about 60 minutes, although shorter or longer periods may be provided depending upon the strength of the particular components of gel and the degree of cleaning and sanitizing required.

After the cleaning and sanitizing period, the thin film of gel may be removed by any suitable means. A desirable method for removing the applied film is by application of water which may be either sprayed or brushed over the surface of the applied film. Various other means may be used to destroy the film of surface adhering gel for removal of the film from the surface to which it is applied. For example, the gel may be broken or destroyed by addition of strongly alkaline materials such as a strong solution of sodium hydroxide having a pH of about 12.

It is generally found that after application of the present gel film and removal thereof from a surface, the surface is effectively sanitized and substantially cleaned.

In order to further illustrate the present invention, the following examples are given wherein all parts are by weight unless otherwise indicated:

EXAMPLE I

A powder gelling composition is prepared by blending in a mixer the following ingredients in the order and amount listed.

| Ingredient: | Parts by wt. |
|---|---|
| Kelzan M Gum (Xanthomonas hydrophilic colloid) | 40.00 |
| Sodium sulfate | 56.85 |
| Sodium linear dodecylbenzene sulfonate (100%) | 2.0 |
| Propylene glycol | 1.0 |
| Fluorescein dye | 0.15 |

EXAMPLE II

A powder gelling composition is prepared by blending in a mixer the following ingredients in the order and amount listed.

| Ingredient: | Parts by wt. |
|---|---|
| Sodium sulfate | 56.85 |
| Kelzan M (Xanthomonas hydrophilic colloid) | 40.0 |
| Linear sodium alkyl napthalene sulfonate (100%) | 2.0 |
| Propylene glycol | 1.0 |
| Fluorescein dye | 0.15 |

EXAMPLE III

A powder gelling composition is prepared by blending in a mixer the following ingredients in the order and amount listed.

| Ingredient: | Parts by wt. |
|---|---|
| Sodium sulfate | 56.85 |
| Kelzan M (Xanthomonas hydrophilic colloid) | 40.0 |
| Sodium N-methyl, N-oleoyl taurate (100%) | 2.0 |
| Propylene glycol | 1.0 |
| Fluorescein dye | .15 |

EXAMPLE IV

A powder gelling composition is prepared by blending in a mixer the following ingredients in the order and amount listed.

| Ingredient: | Parts by wt. |
|---|---|
| Sodium sulfate | 56.85 |
| Kelzan M (Xanthomonas hydrophilic colloid) | 40.00 |
| Linear alkylphenol-ethylene oxide adduct (100%), cloud point, 1%, 75°–212° F. | 2.0 |
| Propylene glycol | 1.0 |
| Fluorescein dye | 0.15 |

EXAMPLE V

A powder gelling composition is prepared by blending in a mixer the following ingredients in the order and amount listed.

| Ingredient: | Parts by wt. |
|---|---|
| Sodium chloride | 56.85 |
| Kelzan M (Xanthomonas hydrophilic colloid) | 40.00 |
| Sodium linear dodecyl benzene sulfonate (100%) | 2.0 |
| Ethylene glycol | 1.0 |
| Fluorescein dye | 0.15 |

EXAMPLE VI

Two parts by weight of the powder gelling composition prepared in Example I was dissolved in 100 parts of 180° F. water to form a thick gel solution. Six parts by weight of an alkaline cleaner composition containing 70% caustic and 30% polyphosphates-sodium silicates was dissolved in the gel solution. The resulting hot alkaline gel solution was sprayed onto soiled metal and concrete surfaces in a meat plant smokehouse. The gel was allowed to cling to the soiled walls and ceilings for about 20–30 minutes, then the surfaces were rinsed with warm water to remove the gel and soil. The cleaning results were found to be excellent and the surfaces were free of gel and soil.

EXAMPLE VII

Two parts by weight of the powder gelling composition prepared in Example I was dissolved in 100 parts of 180° F. water to form a thick gel solution. Six parts, by weight, of a mildly alkaline cleaner composition containing 40% sodium metasilicate, 20% polyphosphate, and 40% sodium carbonate-bicarbonate was dissolved in the gel solution. The resulting hot alkaline gel solution was sprayed onto the metal meat processing equipment (conveyors, neoprene cutting boards, band saws, stainless steel tables) in a meat processing plant cutting room area. The gel was allowed to cling to the surfaces for about 30–40 minutes, then rinsed off with high pressure warm water. The cleaning results were found to be excellent and the surfaces were free of meat fat soil and gel cleaner.

EXAMPLE VIII

Two parts by weight of the powder gelling composition prepared in Example I was dissolved in 90 parts of 180° F. water to form a thick gel solution. Ten parts by weight of acid cleaner solution consisting essentially of phosphoric acid (50%), a nonionic wetting agent (4%), and water (46%) was dissolved in the gel solution. The resulting hot gel solution was sprayed onto metal surfaces containing protein, lime deposits, and metal oxides. After the gel solution had clung to the metal surface for about 15–30 minutes, the surfaces were rinsed with warm water. The cleaning results were found to be excellent with brightening of the metal, dissolving of the metal oxides, and softening and dissolving of the protein soil.

EXAMPLE IX

Two parts by weight of the powder gelling composition prepared in Example I was dissolved in 100 parts of 180° F. water to form a thick gel solution. A concentrated iodophor formulation containing 1.5% available iodine in a phosphoric acid solution was added to the gel solution at 100° F. to provide 50 p.p.m. of available iodine in the gel solutions. The germicidal gel solution was evaluated by a modified bacteriological test procedure, A.O.A.C. Spray Test. The results showed satisfactory evidence of disinfecting action by killing the test organism in 10 of 10 trials.

EXAMPLE X

Two parts by weight of the powder gelling composition prepared in Example I was dissolved in 100 parts of 180° F. water to form a thick gel solution. A concentrated germicidal cleaner containing 10% of sodium ortho benzyl parachlorophenate plus wetting agents was added to the gel solutions at a dilution ratio of 1 part germicide concentrate to 64 parts gel solution. The resulting gel solution was evaluated by a modified A.O.A.C. Spray Test procedure for germicidal properties and the results indicated anti-microbial activity.

It is understood that the foregoing detailed description is given merely by way of illustration and that many variations may be made therein without departing from this invention.

What is claimed is:

1. A gel which comprises:

(A) about 0.1 to about 10 percent by weight of a flowable powder gelling composition consisting essentially of:

(a) about 20 to about 100 parts by weight of Xanthomonas hydrophilic colloid;

(b) about 40 to about 95 parts by weight of a neutral diluent selected from the group consisting of sodium sulfate and sodium chloride;
(c) about 1 to about 10 parts by weight of a linear alkyl benzene sulfonate wherein the alkyl group includes from about 12 to about 14 carbon atoms;
(d) about 1 to about 10 parts by weight of propylene glycol liquid dispersing agent; and
(e) up to about 1 part by weight of fluorescein dye;
(B) an effective amount of a water-soluble cleaning agent; and
(C) water.

2. A gel which comprises:
(A) about 0.1 to about 10 percent by weight of a flowable powder gelling composition consisting essentially of:
(a) about 20 to about 100 parts by weight of Xanthomonas hydrophilic colloid;
(b) about 40 to about 95 parts by weight of a neutral diluent selected from the group consisting of sodium sulfate and sodium chloride;
(c) about 1 to about 10 parts by weight of a linear alkyl benzene sulfonate wherein the alkyl group includes from about 12 to about 14 carbon atoms;
(d) about 1 to about 10 parts by weight of propylene glycol liquid dispersing agent; and
(e) up to about 1 part by weight of fluorescein dye;
(B) an effective amount of a water-soluble sanitizing agent; and
(C) water.

3. A gel which comprises:
(A) about 0.1 to about 10 percent by weight of a flowable powder gelling composition consisting essentially of:
(a) about 20 to about 100 parts by weight of Xanthomonas hydrophilic colloid;
(b) about 40 to about 95 parts by weight of a neutral diluent selected from the group consisting of sodium sulfate and sodium chloride;
(c) about 1 to about 10 parts by weight of a linear alkyl benzene sulfonate wherein the alkyl group includes from about 12 to about 14 carbon atoms;
(d) about 1 to about 10 parts by weight of propylene glycol liquid dispersing agent; and
(e) up to about 1 part by weight of fluorescein dye;
(B) an effective amount of a water-soluble disinfecting agent; and
(C) water.

4. A method for cleaning and sanitizing surfaces which comprises:
(A) adding to hot water to form a gel about 0.1 to about 10 percent by weight of a flowable powder gelling composition consisting essentially of:
(a) about 20 to about 100 parts by weight of Xanthomonas hydrophilic colloid;
(b) about 40 to about 95 parts by weight of a neutral diluent selected from the group consisting of sodium sulfate and sodium chloride;
(c) about 1 to about 10 parts by weight of a linear alkyl benzene sulfonate wherein the alkyl group includes from about 12 to about 14 carbon atoms;
(d) about 1 to about 10 parts by weight of propylene glycol liquid dispersing agent; and
(e) up to about 1 part by weight of fluorescein dye;
(B) adding in an effective amount to the prepared gel a water-soluble cleaning agent;
(C) applying the prepared gel of step (B) to a surface to be cleaned and sanitized;

(D) permitting a film of applied gel of step (C) to remain for up to about 60 minutes; and
(E) removing the applied gel film to effect cleaning and sanitizing.

5. A method for cleaning and sanitizing surfaces which comprises:
(A) adding to hot water to form a gel about 0.1 to about 10 percent by weight of a flowable powder gelling composition consisting essentially of:
(a) about 20 to about 100 parts by weight of Xanthomonas hydrophilic colloid;
(b) about 40 to about 95 parts by weight of a neutral diluent selected from the group consisting of sodium sulfate and sodium chloride;
(c) about 1 to about 10 parts by weight of a linear alkyl benzene sulfonate wherein the alkyl group includes from about 12 to about 14 carbon atoms;
(d) about 1 to about 10 parts by weight of propylene glycol liquid dispersing agent; and
(e) up to about 1 part by weight of fluorescein dye;
(B) adding in an effective amount to the prepared gel a water-soluble sanitizing agent;
(C) applying the prepared gel of step (B) to a surface to be cleaned and sanitized;
(D) permitting a film of applied gel of step (C) to remain for up to about 60 minutes; and
(E) removing the applied gel film to effect cleaning and sanitizing.

6. A method for cleaning and sanitizing surfaces which comprises:
(A) adding to hot water to form a gel about 0.1 to about 10 percent by weight of a flowable powder gelling composition consisting essentially of:
(a) about 20 to about 100 parts by weight of Xanthomonas hydrophilic colloid;
(b) about 40 to about 95 parts by weight of a neutral diluent selected from the group consisting of sodium sulfate and sodium chloride;
(c) about 1 to about 10 parts by weight of a linear alkyl benzene sulfonate wherein the alkyl group includes from about 12 to about 14 carbon atoms;
(d) about 1 to about 10 parts by weight of propylene glycol liquid dispersing agent; and
(e) up to about 1 part by weight of fluorescein dye;
(B) adding in an effective amount to the prepared gel a water-soluble disinfecting agent;
(C) applying the prepared gel of step (B) to a surface to be cleaned and sanitized;
(D) permitting a film of applied gel of step (C) to remain for up to about 60 minutes; and
(E) removing the applied gel film to effect cleaning and sanitizing.

References Cited

UNITED STATES PATENTS

| | | | |
|---|---|---|---|
| 1,483,587 | 2/1924 | Mains | 134—4X |
| 2,221,968 | 11/1940 | Friedmann | 134—4 |
| 2,495,729 | 1/1950 | Hutson et al. | 134—4 |
| 3,020,206 | 2/1962 | Patton et al. | 260—209X |
| 3,063,873 | 11/1962 | Saroyan | 134—4 |
| 3,150,007 | 9/1964 | Kovachy | 134—4 |
| 3,271,319 | 9/1966 | Morrison | 134—4X |
| 3,282,849 | 11/1966 | Diehn et al. | 252—316X |
| 3,360,476 | 12/1967 | Krusius | 252—107 |
| 3,477,951 | 11/1969 | Malmer et al. | 252—106 |

JOSEPH SCOVRONEK, Primary Examiner

D. G. MILLMAN, Assistant Examiner

U.S. Cl. X.R.

21—58; 252—106, 132, 316